(12) United States Patent
Lee et al.

(10) Patent No.: US 7,456,581 B2
(45) Date of Patent: Nov. 25, 2008

(54) POWER SUPPLY, BACKLIGHT APPARATUS, AND DISPLAY DEVICE

(75) Inventors: Sang-Gil Lee, Seoul (KR); Seock-Hwan Kang, Suwon-si (KR); Chun-Ho Song, Seoul (KR); Ju-Young Yoon, Suwon-si (KR); Jong-Seo Lee, Hwaseong-si (KR); Gi-Cherl Kim, Yongin-si (KR); Sang-Yu Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 559 days.

(21) Appl. No.: 11/201,979

(22) Filed: Aug. 11, 2005

(65) Prior Publication Data

US 2006/0038504 A1 Feb. 23, 2006

(30) Foreign Application Priority Data

Aug. 20, 2004 (KR) .................. 10-2004-0066016

(51) Int. Cl.
*H05B 37/00* (2006.01)
(52) U.S. Cl. .................. 315/219; 315/224; 315/225; 315/307
(58) Field of Classification Search .................. 315/224, 315/225, 209 R, 307, 308, 291, DIG. 5, DIG. 7, 315/119, 123, 219
See application file for complete search history.

(56) References Cited

U.S. PATENT DOCUMENTS 5,739,717 A 4/1998 Nakamura

| 6,034,484 | A | * | 3/2000 | Danov et al. ........... 315/209 PZ |
|---|---|---|---|---|
| 6,097,159 | A | | 8/2000 | Mogi et al. |
| 6,297,601 | B1 | * | 10/2001 | Kang ..................... 315/387 |
| 6,400,101 | B1 | | 6/2002 | Biebl et al. |
| 6,586,890 | B2 | | 7/2003 | Min et al. |
| 6,717,559 | B2 | | 4/2004 | Weindorf |

FOREIGN PATENT DOCUMENTS

| JP | 05-094151 | 4/1993 |
|---|---|---|
| JP | 10-032350 | 2/1998 |
| JP | 10-111487 | 4/1998 |
| JP | 11-305198 | 11/1999 |
| JP | 2000-278372 | 10/2000 |

(Continued)

OTHER PUBLICATIONS

English Abstract for Publication No. 05-094151.

(Continued)

*Primary Examiner*—David Hung Vu
(74) *Attorney, Agent, or Firm*—F. Chau & Associates, LLC

(57) ABSTRACT

A power supply includes a light source, a signal converting unit converting an externally supplied AC voltage into a DC voltage, a DC-DC converting unit converting a magnitude of the DC voltage, and a light source protecting unit. The light source protecting unit outputs the DC voltage of a predetermined range as a light source driving voltage to supply a stabilized source driving voltage to the light source and suspending an application of the light source driving voltage to the light source when a magnitude of the light source driving voltage is larger than a predetermined value, based on an externally supplied control signal.

16 Claims, 5 Drawing Sheets

FOREIGN PATENT DOCUMENTS

| | | |
|---|---|---|
| JP | 2001-326703 | 11/2001 |
| JP | 2002-244103 | 8/2002 |
| JP | 2003-151784 | 5/2003 |
| JP | 2003-215534 | 7/2003 |
| JP | 2004-022646 | 1/2004 |
| JP | 2004-0028976 | 4/2004 |
| KR | 1999-0084247 | 12/1999 |
| KR | 2002-0084125 | 11/2002 |

OTHER PUBLICATIONS

English Abstract for Publication No. 10-032350.
English Abstract for Publication No. 10-111487.
English Abstract for Publication No. 11-305198.
English Abstract for Publication No. 1999-0084247.
English Abstract for Publication No. 2000-278372.
English Abstract for Publication No. 2001-326703.
English Abstract for Publication No. 2002-244103.
English Abstract for Publication No. WO0248994 (for 2002-0084125).
English Abstract for Publication No. 2003-151784.
English Abstract for Publication No. 2003-215534.
English Abstract for Publication No. 2004-022646.
English Abstract for Publication No. WO03015476 (for 10-2004-0028976).

* cited by examiner

POWER SUPPLY, BACKLIGHT APPARATUS, AND DISPLAY DEVICE

BACKGROUND OF THE INVENTION (a) Field of the Invention

The present invention relates to a power supply, a backlight apparatus, and a display device.

(b) Description of Related Art

Display devices used for computer monitors and television sets include self-emitting displays such as light emitting diodes (LEDs), electroluminescence (EL) displays, vacuum fluorescent displays (VFDs), field emission displays (FEDs), and plasma display panels (PDPs), and non-emitting displays such as liquid crystal displays (LCDs) that include a light source.

An LCD includes two panels provided with field-generating electrodes and a dielectric anisotropy liquid crystal (LC) layer interposed therebetween. The field-generating electrodes supplied with electric voltages generate an electric field in the liquid crystal layer, and the transmittance of light passing through the panels varies depending on the strength of the applied field, which can be controlled by the applied voltages. Accordingly, desired images are obtained by adjusting the applied voltages.

The light may be emitted from a light source equipped in the LCD or may be natural light.

A lighting device for an LCD, i.e., a backlight assembly, usually includes a plurality of fluorescent lamps such as external electrode fluorescent lamps (EEFLs) and cold cathode fluorescent lamps (CCFLs), or a plurality of light emitting diodes (LEDs) as light sources, which uniformly transmit the light to an entire front surface of the LC panels from a rear of the LC panels.

When using the fluorescent lamps, characteristics of pixel elements of the display device deteriorate due to power consumption and heating by the fluorescent lamps.

In addition, the fluorescent lamps are elongated in the shape of a stick, which can easily break on impact. Moreover, the luminance of fluorescent lamps can vary with temperature or position the luminance of the image quality can vary.

However, when using the LEDs, since each LED is a semiconductor device, the lifetime of the LED is longer, the speed of the LED is faster, and power consumption is lower than the fluorescent lamps. The LED is also sturdy and miniaturization thereof is easy.

LEDs can be used as light sources in computer monitors and in middle or large sized LCD television sets, as well as light sources for small sized LCD displays, such as in a mobile telephone or a light source.

Fluorescent lamps are activated by an AC (alternate current) voltage, while the LEDs are activated by a DC (direct current) voltage. Accordingly, for systems using the LEDs, the backlight assembly includes a power supply converting an AC voltage into a DC voltage and changing a magnitude of the DC voltage into a predetermined magnitude.

Driving voltages applied from the power supply are converted into voltages with a square wave for driving the LEDs. However, if the level of the voltage is changed, and/or if there are excessive noise levels, an excessive amount of current exceeding specified instantaneous maximum values can flow to the LEDs, and the LEDs may be destroyed.

Therefore, a need exists for a system and method for a power supply, a backlight apparatus, and a display device.

SUMMARY OF THE INVENTION

According to an embodiment of the present invention, a power supply is provided, which includes a light source, a signal converting unit converting an externally supplied AC voltage into a DC voltage, a DC-DC converting unit converting a magnitude of the DC voltage, and a light source protecting unit. The light source protecting unit outputs the DC voltage of a predetermined range as a light source driving voltage to supply the stabilized source driving voltage to the light source and suspends the application of the light source driving voltage to the light source when a magnitude of the light source driving voltage is larger than a predetermined value, based on an externally supplied control signal.

The light source includes a light emitting diode (LED).

The light source protecting unit includes a signal inputting unit varying a signal outputted based on an externally supplied control signal, a transformer generating a signal with a predetermined magnitude based on the signal from the signal inputting unit, a switching unit changing the DC voltage from the DC-DC converting unit into a voltage with a square wave based on the voltage from the transformer, an inductor averaging the square wave voltage from the switching unit to generate an average voltage and applying the average voltage as the light source driving voltage to the light source, and a sensing unit suspending an operation of the signal inputting unit when a magnitude of the average voltage from the inductor is larger than a predetermined value.

The light source protecting unit further includes a voltage dividing unit dividing the average voltage from the inductor, wherein the DC-DC converting unit adjusts the light source driving voltage based on the divided voltage from the voltage dividing unit.

According to an embodiment of the present invention, a stabilizer includes a signal inputting unit being supplied with an external control signal, a transformer connected to a supply voltage and the signal inputting unit, and a switching unit being applied with an externally supplied voltage. The stabilizer includes a switching controlling unit connected to the transformer and the switching unit, a voltage averaging unit connected to the switching unit, a voltage dividing unit connected to the voltage averaging unit, and an overcurrent detecting unit connected to the voltage averaging unit.

The signal inputting unit includes a switching element supplied with the control signal.

The transformer is a pulse transformer.

The switching unit includes a switching element having an input terminal to which an externally supplied voltage is applied and a control terminal connected to the switching controlling unit.

The switching unit further includes a diode connected between the input terminal and the output terminal of the switching element.

The switching controlling unit includes a first resistor connected to the transformer and a diode and a zener diode connected in series between the first resistor and the transformer.

The switching controlling unit further includes a capacitor connected to the first resistor and a second resistor connected between the first resistor and the zener diode.

The voltage dividing unit includes a voltage divider connected between the switching unit and a ground.

The voltage dividing unit further includes a capacitor connected between the voltage divider and the ground.

The voltage averaging unit may include an inductor.

The overcurrent sensing unit includes a capacitor connected to the switching unit, a resistor connected between the capacitor and the ground, and a switching element having a control terminal connected to the resistor, an input terminal connected to the signal inputting unit, and an output terminal connected to the ground.

The overcurrent sensing unit further includes a capacitor connected to the input terminal of the switching element and the ground.

The stabilizer further includes a diode connected to the supply voltage and the transformer.

According to an embodiment of the present invention, a backlight apparatus is provided, which includes a lamp unit having at least one light source, an AC-DC converting unit converting an externally supplied AC voltage into a DC voltage, a DC-DC converting unit converting a magnitude of the DC voltage, a lamp protecting unit outputting the DC voltage of a predetermined range as a light source driving voltage to supply a stabilized source driving voltage to the light source and suspending an application of the light source driving voltage to the light source when a magnitude of the light source driving voltage is larger than a predetermined value, based on an externally supplied control signal.

The light source is a red light emitting diode (LED), a green LED, or a blue LED.

According to an embodiment of the present invention, a display device having a plurality of pixels, a lamp unit emitting light to the pixels, and a power supply applying a lamp driving voltage to the lamp unit is provided. The power supply includes a DC-DC converting unit converting a magnitude of an externally supplied DC voltage, and a lamp protecting unit outputting the DC voltage of a predetermined range as the lamp driving voltage to supply a stabilized lamp driving voltage to the lamp unit and suspending an application of the lamp driving voltage to the lamp unit when a magnitude of the lamp driving voltage is larger than a predetermined value, based on an externally supplied control signal.

The lamp protecting unit includes a signal inputting unit varying a signal outputted based on the control signal, a transformer generating a signal with a predetermined magnitude based on the signal from the signal inputting unit, a switching unit changing the DC voltage from the DC-DC converting unit into a voltage with a square wave based on the voltage from the transformer, a inductor averaging the square wave voltage from the switching unit to generate an average voltage and applying the average voltage to the lamp unit, and a sensing unit suspending the operation of the signal inputting unit when a magnitude of the average voltage from the inductor is larger than a predetermined value.

The lamp unit includes at least one light emitting diode.

BRIEF DESCRIPTION OF THE DRAWINGS

The present invention will become more apparent by describing embodiments thereof in detail with reference to the accompanying drawings, in which.

DETAILED DESCRIPTION OF PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein.

Power supplies and backlight apparatuses according to embodiments of the present invention will be described with reference to the accompanying drawings.

A liquid crystal display according to an embodiment of the present invention is described in detail with reference to FIGS. 1-3.

Figure 1:
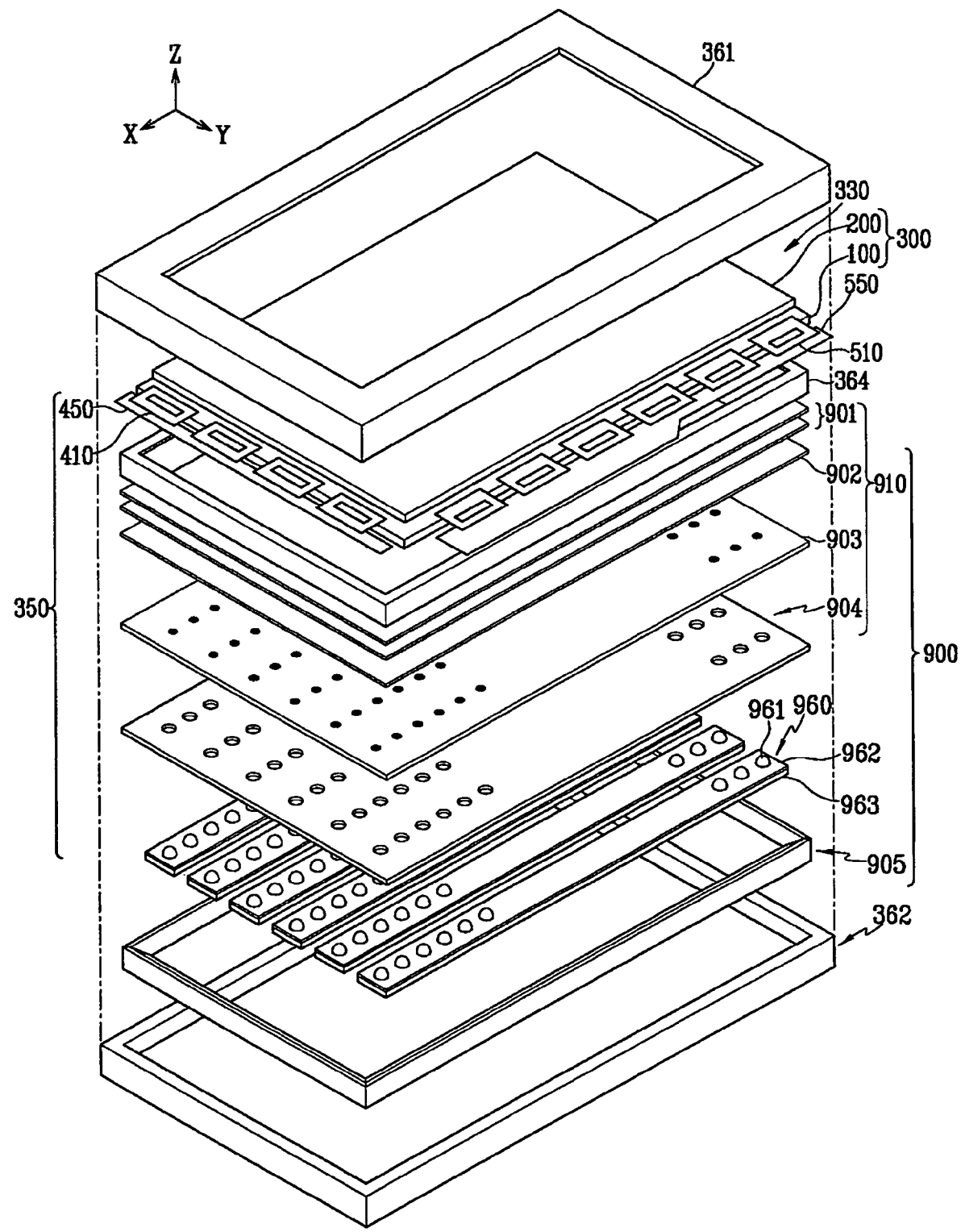
FIG. 1 is an exploded perspective view of an LCD according to an embodiment of the present invention.
Figure 2:
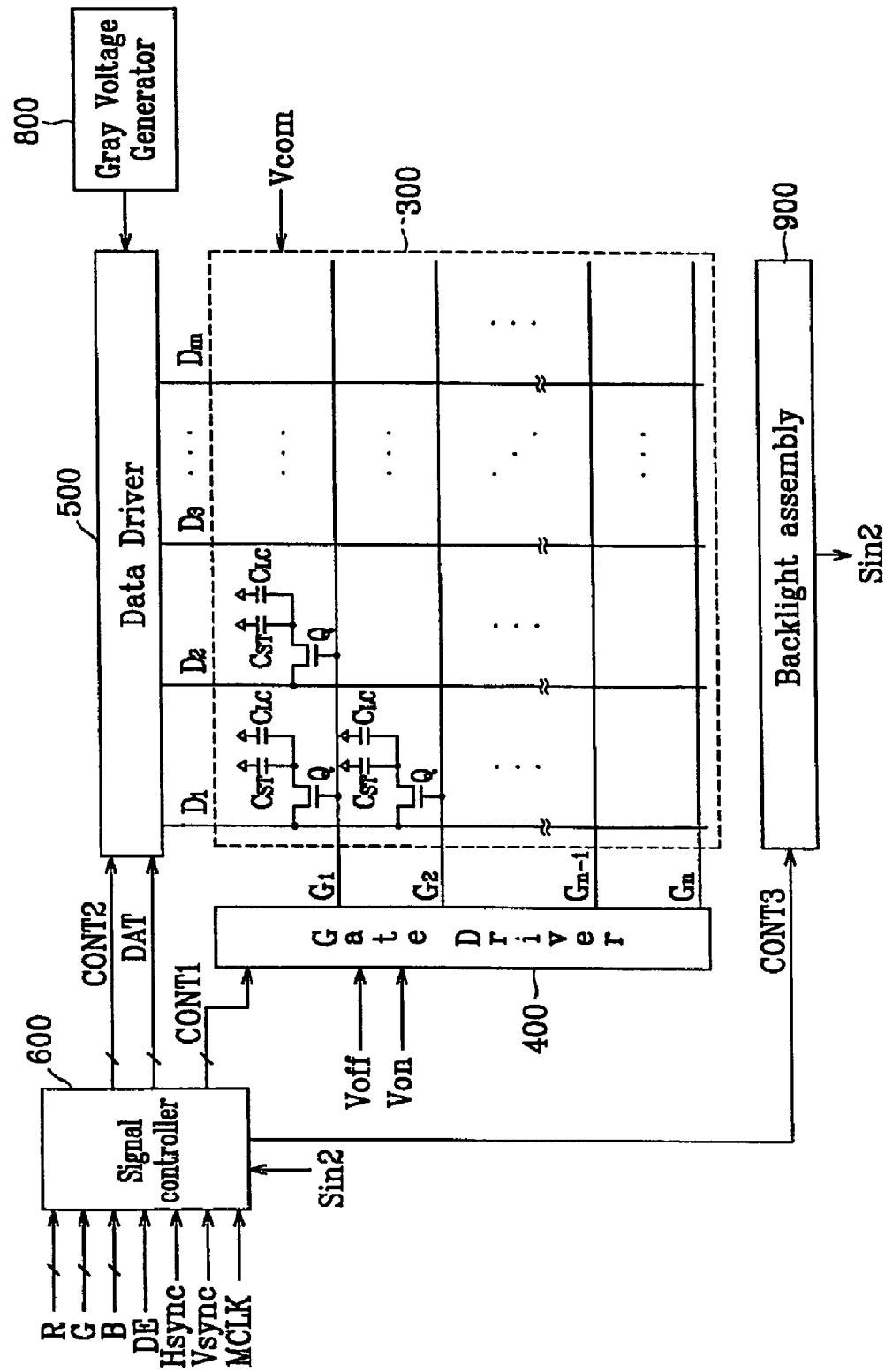
FIG. 2 is a block diagram of a part of the LCD shown in FIG. 1.
Figure 3:
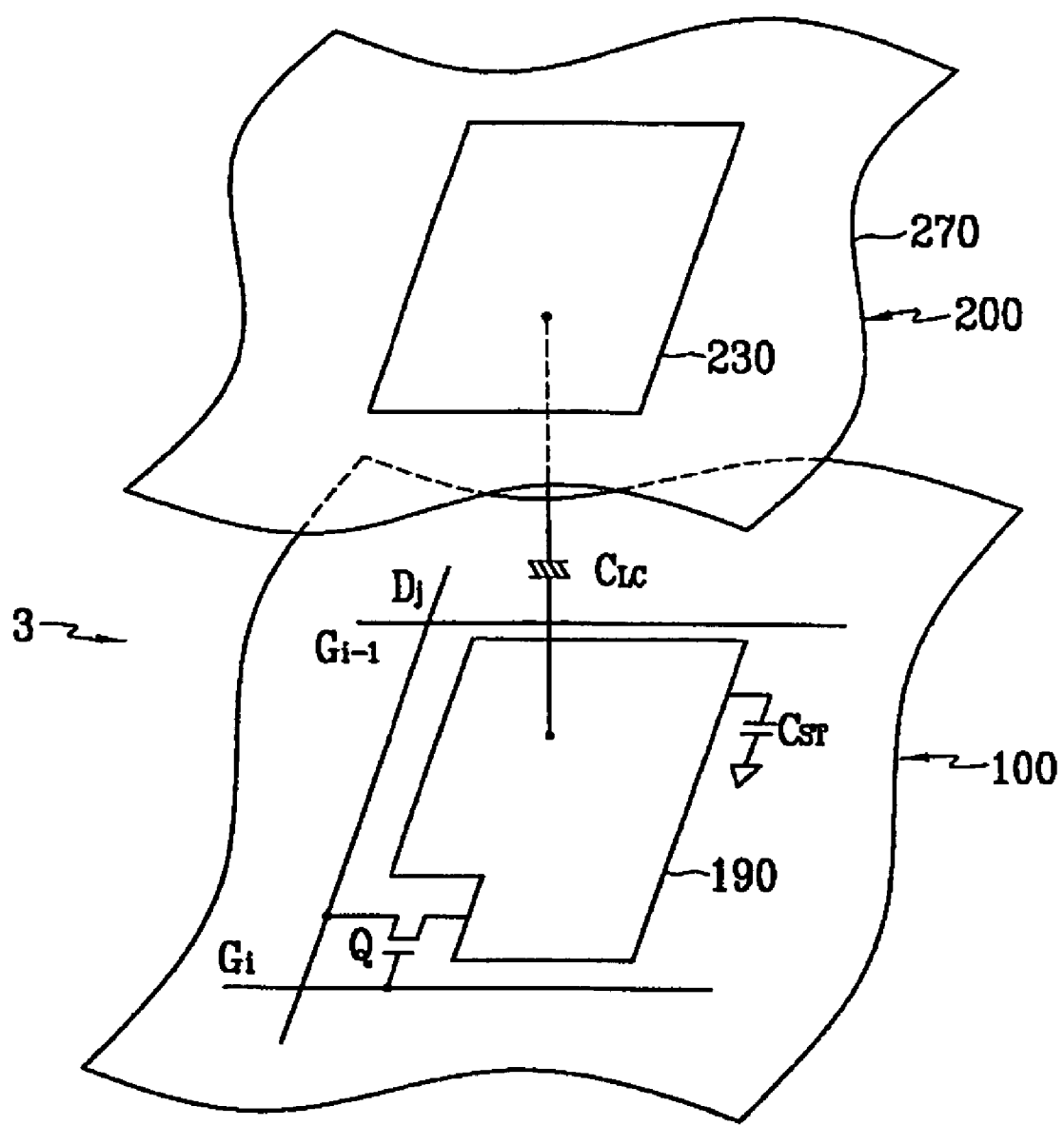
FIG. 3 is an equivalent circuit diagram of a pixel of the LCD shown in FIG. 1.
Figure 4:
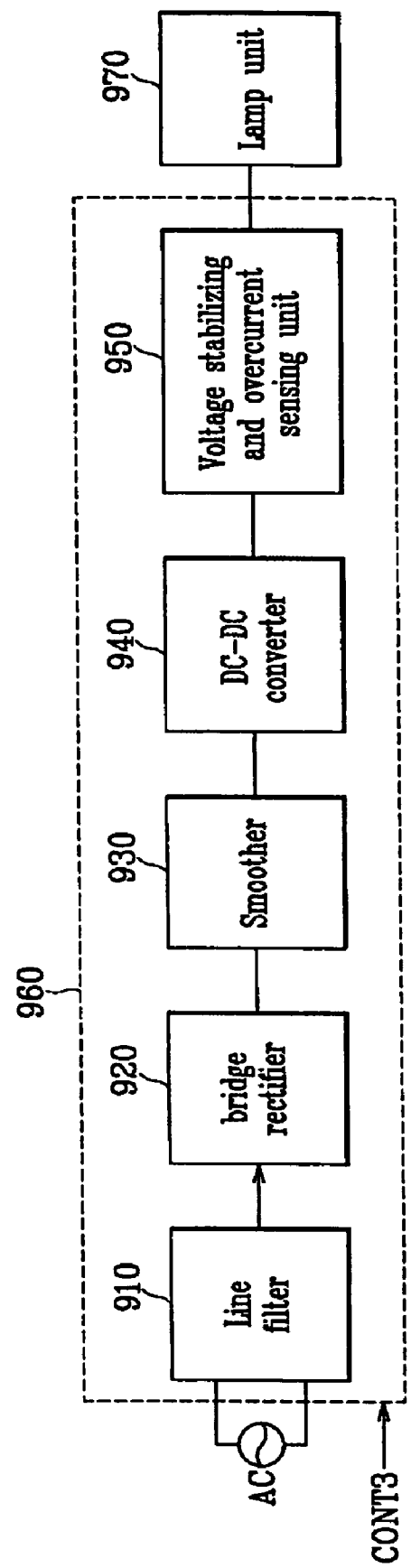
FIG. 4 is a block diagram of a backlight assembly according to an embodiment of the present invention.

FIG. 1 is an exploded perspective view of an LCD according to an embodiment of the present invention, FIG. 2 is a block diagram of a part of the LCD shown in FIG. 1, and FIG. 3 is an equivalent circuit diagram of a pixel of the LCD shown in FIG. 1. FIG. 4 is a block diagram of a backlight assembly according to an embodiment of the present invention.

Referring to FIG. 1, the LCD according to an embodiment of the present invention includes a display module 350 including a display unit 330 and a backlight assembly 900, a pair of front and rear cases 361 and 362, and a mold frame 364.

The display unit 330 includes a display panel assembly 300, a plurality of gate tape carrier packages (TCPs) or chip-on-film (COF) packages 410, and a plurality of data TCPs 510 attached to the display panel assembly 300. The display unit 330 further includes a gate printed circuit board (PCB) 450 and a data PCB 550 attached to the gate and the data TCPs 410 and 510, respectively.

The display panel assembly 300 includes a lower panel 100, an upper panel 200, and a liquid crystal layer 3 interposed therebetween as shown in FIG. 3. The display panel assembly 300 further includes a plurality of display signal lines G1-Gn and D1-Dm, and a plurality of pixels connected thereto. The display signal lines G1-Gn and D1-Dm are arranged substantially in a matrix, e.g., as shown in FIG. 2.

The display signal lines G1-Gn and D1-Dm are disposed on the lower panel 100 and include a plurality of gate lines G1-Gn transmitting gate signals (also referred to as "scanning signals"), and a plurality of data lines D1-Dm transmitting data signals. The gate lines G1-Gn extend substantially in a first direction, e.g., a row direction, and are substantially parallel to each other. The data lines D1-Dm extend substantially in a second direction perpendicular to the first direction, e.g., a column direction, and are substantially parallel to each other.

Referring to FIG. 2, each pixel includes a switching element Q connected to the display signal lines G1-Gn and D1-Dm, and an LC capacitor $C_{LC}$ and a storage capacitor $C_{ST}$ that are connected to the switching element Q. The storage capacitor $C_{ST}$ may be omitted if it is unneeded.

The switching element Q may be implemented as a TFT and is disposed on the lower panel 100. The switching element Q has three terminals including a control terminal connected to one of the gate lines G1-Gn, an input terminal connected to one of the data lines D1-Dm, and an output terminal connected to the LC capacitor $C_{LC}$ and the storage capacitor $C_{ST}$.

Referring to FIG. 3, the LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as a dielectric of the LC capacitor $C_{LC}$. The pixel electrode 190 is connected to the switching element Q, and the common electrode 270 is supplied with a common voltage Vcom and covers an entire surface of the upper panel 200. Unlike in FIG. 3, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line, which is provided on the lower panel 100. The separate signal line overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one color (i.e., spatial division) or each pixel sequentially represents multiple colors, e.g., primary colors, in turn (i.e., temporal division) such that a spatial or temporal sum of the primary colors is recognized as a desired color. An example of a set of the primary colors includes red, green, and blue colors. FIG. 3 shows an example of the spatial division in which each pixel includes a color filter 230 representing one of the primary colors in an area of the upper panel 200 facing the pixel electrode 190. Alternatively, the color filter 230 is provided on or under the pixel electrode 190 on the lower panel 100.

As shown in FIGS. 1 and 2, the gate TCPs 410 are a flexible printed circuit (FPC) film and are attached to an edge of the lower panel 100 of the LC panel assembly 300. The gate TCPs 410 mount gate integrated circuit (IC) chips forming a gate driver 400, and the data TCPs 510 mount data IC chips forming a data driver 500. The gate driver 400 and the data driver 500 are electrically connected to the gate lines G1-Gn and the data lines D1-Dm of the panel assembly 300 through signal lines (not shown) formed on the TCPs 410 and 510, respectively.

The gate driver 400 generates gate signals including a gate-on voltage Von and a gate-off voltage Voff for application to the gate lines G1-Gn, The data driver 500 applies data voltages to the data lines D1-Dm.

Alternatively, the driving IC chips for the gate driver 400 and the data driver 500 may be directly mounted on the panel assembly without TCPs, which is called "chip on glass" (COG) mounting. The gate driver 400 or the data driver 500 may be formed on the LC panel assembly 300 together with the switching elements Q and the display signal lines G1-Gn and data lines D1-Dm.

The gate PCB 450 is attached to the TCPs 410 in a longitudinal direction along an edge of the lower panel 100, and the data PCB 550 is attached to the TCPs 510 in a longitudinal direction along another edge of the lower panel 100.

The gate PCB 450 and the data PCB 550 mount a gray voltage generator 800 and a signal controller 600 as well as signal lines (not shown).

The gray voltage generator 800 generates two sets of gray voltages related to the transmittance of the pixels, and applies gray voltages to be selected as the data voltages to the data driver 500.

The signal controller 600 controls the drivers 400 and 500, etc.

As shown in FIGS. 1, 2, and 4, the backlight assembly 900 includes a lamp unit 960 housed in the rear chassis 362 and fixed thereto and disposed on the LC panel assembly 300. The backlight assembly 900 further includes optical equipment 910 disposed between the LC panel assembly 300 and the lamp unit 960 adjusting light emitting from the lamp unit 960, and a power supply 970 applying a supply voltage to the lamp unit 960. The backlight assembly 900 also includes a supporting frame 905 housed in the rear chassis 362 fixed to the lamp unit 960. The supporting frame 905 is fixed to the mold frame 364.

The lamp unit 960 includes a plurality of PCBs 962, which mount a plurality of LEDs 961, and radiant heat members 963 attached to the PCBs 962 to radiate heat. The radiant heat members 963 are preferable made of heat conducting materials. Each PCB 962 is arranged horizontally along a longitudinal axis and mounts in turn red, green, and blue LEDs 961. The number of green LEDs may be larger than the number of red and blue LEDs, respectively, for example, preferably by about two times. However, the number of LEDs may be changed if needed.

One or more polarizers (not shown) for polarizing the light from the lamp unit 960 are attached to the outer surfaces of the panels 100 and 200.

The optical equipment 910 includes a reflector 904, a light guide plate 903, a spread plate 902, and a least one optical sheet 901.

The reflector 904 is disposed between the LC assembly panel 300 and the lamp unit 960. The reflector 904 has a plurality of light emitting holes of a predetermined size that are arranged at predetermined intervals, and reflects light not passing through the light emitting holes in a downward direction.

The light guide plate 903 is disposed over the reflector 904 and has light blocking films formed on portions facing the respective LEDs 961. The light guide plate 903 uniformly maintains the intensity of light from the LEDs 961.

The spread plate 902 guides and spreads light from the light guide plate 903 to the LC panel assembly 300.

The optical sheet 901 guarantees luminance characteristics.

In FIG. 1, each light emitting hole formed on the reflector 904 has a circular shape such that the corresponding LED is projected through the hole. It is preferable to have sizes and shapes such as a rectangular shape or a slit shape adapted to project a predetermined number of the LEDs. The internal lateral sides of the supporting frame 905 are inclined relative to an upper surface thereof to reflect the light from the lamp unit 960 in an upward direction.

As shown in FIG. 4, the power supply 960 includes a line filter 910, a bridge rectifier 920 connected to the line filter 910, a smoother 930 connected to the bridge rectifier 920, a DC-DC converter 940 connected to the smoother 930, and a voltage stabilizer and overcurrent sensor 950. The power supply 950 is supplied with an AC voltage of about 90V to 220V.

Not shown in FIG. 1, an upper case and a lower case are disposed on the front chassis 361 and the rear chassis 362, respectively, and couple with each other to complete the LCD.

The operation of the LCD will be described in detail with reference to FIGS. 1 to 4.

Referring to FIG. 2, the signal controller 600 is supplied with input image signals R, G, and B and input control signals controlling the display thereof such as a vertical synchronization signal Vsync, a horizontal synchronization signal Hsync, a main clock MCLK, and a data enable signal DE, from an external graphics controller (not shown). The signal controller 600 generates gate control signals CONT1, data control signals CONT2, and backlight control signals CONT3. The signal controller 600 processes the image signals R, G, and B to be suitable for the operation of the panel assembly 300 on the basis of the input control signals and the input image signals R, G, and B. The signal controller 600 provides the gate control signals CONT1 to the gate driver 400, the processed image signals DAT and the data control signals CONT2 to the data driver 500, and the backlight control signals CONT3 to the backlight assembly 900.

The gate control signals CONT1 include a scanning start signal STV for initiating scanning, and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for initiating data transmission for a group of pixels, a load signal LOAD for initiating the application of the data voltages to the data lines $D_1$-$D_m$, and a data clock signal HCLK. The data control signal CONT2 may further include an inversion signal RVS for reversing the polarity of the data voltages (with respect to the common voltage Vcom).

The backlight control signals CONT3 include a plurality of control signals such as PWM (pulse width modulation) signals controlling the LEDs 961 of the lamp unit 960 and controlling the DC-DC converter 940 of the power supply 960.

The backlight control signals CONT3 include a plurality of PWM (pulse width modulation) control signals such as a lamp control signal controlling the LEDs 961 of the lamp unit 970, a power supply control signal controlling the DC-DC converter 940 of the power supply 960, and a switching control signal controlling the operations of the voltage stabilizer and overcurrent sensor 950.

Alternatively, the backlight control signals CONT3 are supplied from a separate controller instead of the signal controller 600.

In response to the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines $D_1$-$D_m$.

The gate driver 400 applies the gate-on voltage Von to the gate line $G_1$-$G_n$ in response to the gate control signals CONT1 from the signal controller 600, thereby turning on the switching elements Q connected thereto. The data voltages applied to the data lines $D_1$-$D_m$ are supplied to the pixels through the activated switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage.

The power supply 960 supplying driving voltages to the lamp unit 970 filters noises contained in an externally supplied AC input voltage by using the line filter 910 to apply the AC input voltage to the bridge rectifier 920. The line filter 910 has a turn ratio of "1" of a primary coil (not shown) and a secondary coil (not shown) such that loss of an output voltage with respect to the input voltage is not generated.

The bridge rectifier 920 half wave rectifies the AC input voltage from the line filter 910 to convert a DC voltage, and applies the converted DC voltage to the smoother 930.

The smoother 930 smoothes the DC voltage having ripples and applies the smoothed DC voltage to the DC-DC converter 940.

The DC-DC converter 940 boosts the DC voltage inputted from the smoother 930 to a predetermined magnitude for driving the lamp unit 970 based on the backlight control signals CONT3, and outputs the boosted DC voltage to the lamp unit 970. The operations of the DC-DC converter 940 will be described later in detail.

The voltage stabilizer and overcurrent sensor 950 is supplied with the boosted voltage from the DC-DC converter 940 and the switching control signals of the backlight control signals CONT3, and cuts off the boosted voltages when overcurrents are sensed in currents flowing into the lamp unit 970 corresponding to the boosted voltages, based on the switching control signals. The operations of the voltage stabilizer and overcurrent sensor 950 will be described later in detail.

The lamp unit 970 drives based on the backlight control signals CONT3 and the DC voltage from the power supply 960 to turn-on or turn-off the LEDs 961. By a mix of the light of the red, green, and blue colors from the red, green, and blue LEDs, white color light is emitted from the lamp unit 970.

The light from the backlight assembly 900 passes through the LC layer 300 and experiences a change of its polarization. The change of the polarization is converted into that of the light transmittance by the polarizers.

By repeating this procedure by a unit of the horizontal period (which is denoted by "1H" and is equal to one period of the horizontal synchronization signal Hsync and the data enable signal DE), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion"). The inversion control signal RVS may also be controlled such that the polarity of the data voltages flowing in a data line in one frame is reversed (for example, line inversion and dot inversion), or the polarity of the data voltages in one packet is reversed (for example, column inversion and dot inversion).

Now, a voltage stabilizer and overcurrent sensor 950 according to an embodiment of the present invention will be described in detail with reference to FIG. 5.

Figure 5:
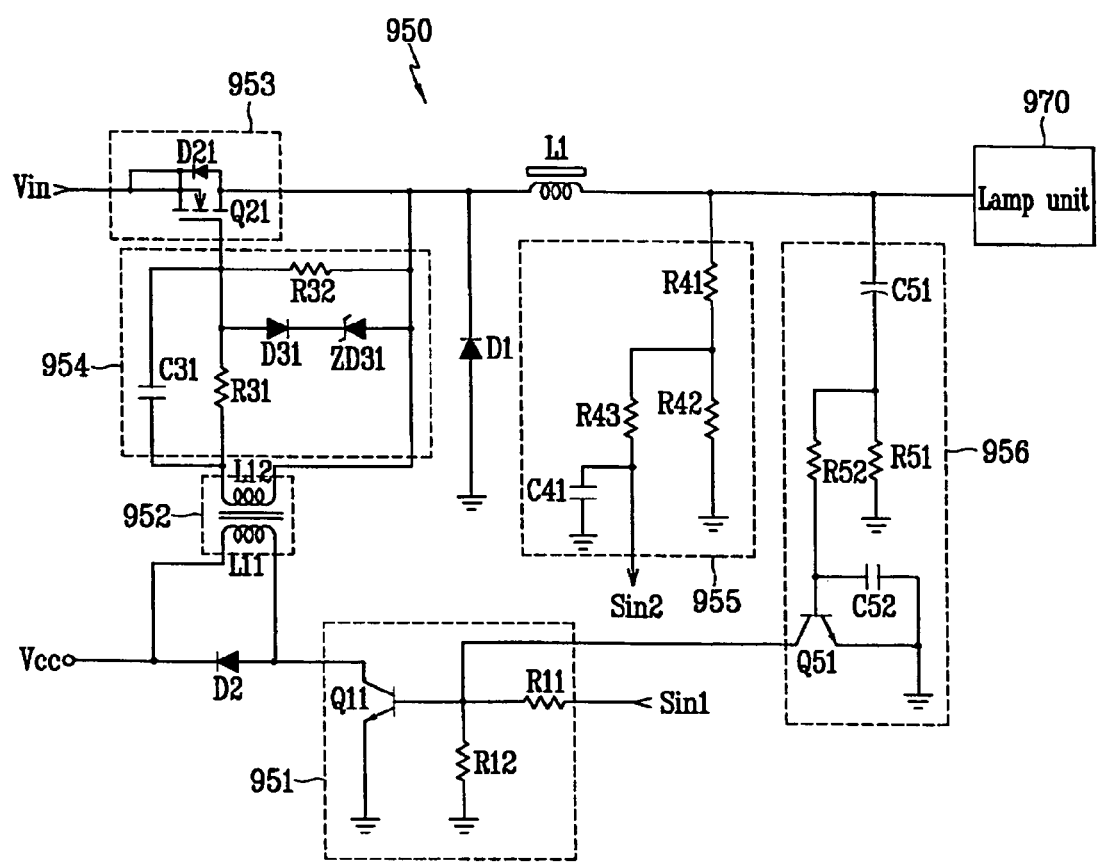
FIG. 5 is a circuit diagram of a voltage stabilizer and an overcurrent sensor shown in FIG. 4.

FIG. 5 is a circuit diagram of a voltage stabilizer and overcurrent sensor 950 shown in FIG. 4.

As shown in FIG. 5, the voltage stabilizer and overcurrent sensor 950 includes a signal inputting unit 951, a pulse transformer 952 connected to a supply voltage Vcc and the signal inputting unit 951, a switching unit 953 being applied with an input voltage Vin from the DC-DC converter 940 having a control terminal that is connected to the pulse transformer 952, a switching controller 954 connected between the switching unit 953 and the pulse transformer 952, an inductor L1 connected between an output terminal of the switching unit 953 and the lamp unit 970, an output voltage sensing unit 955 connected between the inductor L1 and the ground, an overcurrent sensing unit 956 connected to the inductor L1 and the lamp unit 970, a diode D1 connected to the ground in a reverse direction from the switching unit 953, and a diode D2 connected to the pulse transformer 952 in a reverse direction from the supply voltage Vcc.

The signal inputting unit 951 includes a resistor R11 being supplied with a switching control signal Sin1, a resistor R12 connected between the resistor R11 and the ground, a switching element Q11 having an emitter that is commonly connected to the resistors R11 and R12, and a collector. The emitter of the switching element Q11 is grounded and the collector thereof is connected to the diode D2.

The pulse transformer 952 includes a primary coil L11 having both terminals connected to the supply voltage Vcc and the collector of the switching element Q11 of the signal input unit 951, and a secondary coil L12 having a terminal connected to the switching controller 954 and another terminal connected to the switching unit 953.

The switching unit 953 includes a switching element Q21 having a drain supplied with the input voltage Vin, a gate connected to the switching controller 954, and a source connected to another terminal of the secondary coil L12 of the pulse transformer 952 and a diode D21 connected to the drain of the switching element Q21 in a forward direction from the source.

The switching controller 954 includes a resistor R31 connected between the terminal of the secondary coil L21 and the gate of the switching element Q21, and a resistor R32 connected between the gate and the source of the switching element Q 21. The switching controller 954 further includes a diode D31 connected in the forward direction to the gate of the switching element Q21 of the switching unit 953, a zener diode ZD31 connected between the diode D31 and the source of the switching element Q21 in the reverse direction from the diode D31, and a capacitor C31 connected to both terminals of the resistor R31.

The output voltage sensing unit 955 includes resistors R41 and R42, a resistor R43 commonly connected to the resistor R41 and R42 and transmitting a voltage sensing signal Sin2 to the signal controller 600, and a capacitor C41 connected between the resistor R43 and the ground.

The overcurrent sensing unit 956 includes a capacitor C51 connected to the inductor L1, a resistor R51 connected between the capacitor C51 and the ground, and a resistor R52 connected to the resistor R51. The overcurrent sensing unit 956 further includes a switching element Q51 having a base connected to the resistor R52 and a collector-connected to a base of the switching element Q11 of the signal inputting unit 951, and a capacitor C52 connected between the base of the element Q51 and the ground. An emitter of the switching element Q51 is grounded.

The switching elements Q11, Q21, and Q51 are all transistors. The switching elements Q11 and Q51 are BJTs (bipolar junction transistors) and the switching element Q21 is a MOSFET (metal oxide silicon field effect transistor). However, the types of the switching elements Q11, Q21, and Q51 may be changed.

Now, the operations of the voltage stabilizer and overcurrent sensing unit 950 will be described in detail.

When the signal inputting unit 951 is supplied with the switching control signal Sin1 from the signal controller 600, the signal inputting unit 951 divides the switching control signal Sin1 by using the resistors R11 and R12, to apply the divided switching control signal Sin1 to the base of the switching element Q11.

The switching control signal Sin1 is a PWM signal with a predetermined period. Thus, the switching element Q11 maintains a turned-on state at a high level of the switching control signal Sin1, but a turned-off state at a low level thereof.

The primary coil L11 of the pulse transformer 952 is supplied with the supply voltage Vcc by the operation of the switching element Q11 based on the states of the switching control signal Sin1.

When the switching element Q11 of the signal inputting unit 951 is turned off, the diode D2 functions to flow the remaining current in the primary coil L11 of the pulse transformer 952 into the supply voltage Vcc. Accordingly, failures due to the remaining current are decreased.

The pulse transformer 952 generates a voltage with a predetermined magnitude based on the turn ratio and a voltage applied to the primary coil L11, and applies the generated voltage to the switching controller 954. The turn ratio of the primary coil L11 and the secondary coil L12 is about 1:1, and the magnitude of the generated voltage in the secondary coil L12 is substantially equal to the applied voltage to the primary coil L11. Since external noises are not transmitted to the secondary coil L12, the generated voltage is stable, and thereby the reliability of the voltage stabilizer and overcurrent sensor 950 improves.

The switching controller 954 applies a voltage from one terminal of the secondary coil L12 of the pulse transformer 952 to the gate of the switching element Q21 of the switching unit 953 through the resistor R31, and applies a voltage from another terminal of the secondary coil L12 to the source of the switching element Q21. Thus, the switching element Q21 is turned on or off based on the voltage difference between the gate and the source of the switching element Q21.

When a magnitude of the voltage applied to the gate of the switching element Q21 is larger than a predetermined value, for example, about 15V and more, the zener diode ZD31 is turned on. Thus, the destruction of the switching element Q21 due to application of a voltage of more than the predetermined value is prevented.

In the switching controller 954, the resistor R32 provides a path for discharging charges charged in a parasitic capacitor (not shown) when the switching element Q21 of the switching unit 953 is turned off and the capacitor C31 functions as a filter for filtering noise components contained in the applied voltage to the switching element Q21 of the switching unit 953.

By the operation of the switching element Q21 of the switching unit 953, the voltage with a square wave, to which a high level such as the input voltage Vin and a low level such as 0V is applied in turn, is applied to the inductor L1. At this time, like the diode D2, the diode D21 functions to flow the remaining current in the inductor L1 into the input voltage Vin.

The inductor L1 averages the applied voltage with the square wave to apply the averaged voltage as a driving voltage to the lamp unit 970.

Accordingly, the lamp unit 970 is turned on or off based on the average voltage and a lamp control signal (not shown).

An amount of current flowing through the respective LEDs of the lamp unit 970 is varied, and thereby the luminance of the LEDs is varied. Accordingly, the total luminance of the lamp unit 970 is varied in accordance with a turned-on and turned-off period of the switching element Q21. As a result, the total luminance of the lamp unit 970 is varied based on the switching control signal Sin1.

The voltage from the inductor L1 is applied to the output voltage sensing unit 955. The output voltage sensing unit 955 divides the voltage from the inductor L1 by using the resistors R41 and R42 to adjust a level of the voltage from the inductor L1, and applies the adjusted voltage as the voltage sensing signal Sin2 to the signal controller 600 through the resistor R43. The capacitor C41 filters noise components contained in the voltage sensing signal Sin2.

The signal controller 600 determines a magnitude of the applied voltage to the lamp unit 970 based on the voltage sensing signal Sin2. When the magnitude of the applied voltage is not within a predetermined range, the signal controller 600 adjusts a pulse width of a power supply control signal of the backlight control signals CONT3 to generate the desired driving voltage for the lamp unit 970. At this time, for the adjusting of the pulse width of the power supply control signal, the signal controller 600 includes a separate control circuit.

In addition, the voltage from the inductor L1 is applied to the overcurrent sensing unit 956. After the charging of the capacitor C51, the charged voltage is applied to the resistors R51 and the base of the switching element Q51 through the resistor R52. When an overcurrent with a predetermined magnitude or more flows due to noise components through the resistor R52, the voltage applied to the base of the switching element Q51 has a magnitude of more than a predetermined value. The predetermined value may be a value which makes the switching element Q51 turn on. Accordingly, when the overcurrent is generated, the switching element Q51 is turned on.

When the switching element Q51 is turned on, the switching control signal Sin1 which is applied to the base of the switching element Q11 of the signal inputting unit 951 flows through the turned-on switching element Q51. As a result, the switching element Q11 of the signal inputting unit 951 maintains a turned-off state while the overcurrent is sensed by the overcurrent sensing unit 956.

Thus, the operations of the pulse transformer 952 and the switching controller 954 are suspended, and thereby the lamp unit 970 is protected from the overcurrent. The capacitor C51 is for filtering noise components.

The diode D1 does not have functions to provide a pass for transmitting the energy charged in the inductor L1 to the lamp unit 970 when the switching element Q21 of the switching unit 953 is turned off.

Alternatively, more than one voltage stabilizer and overcurrent sensor 950 may be implemented for driving a red diode group, a green diode group, and a blue diode group of the lamp unit 970, and may be varied if needed.

According to an embodiment of the present invention, when an overcurrent flows through the lamp unit, a driving voltage for the lamp unit is applied, and thereby the destruction of the lamp unit due to the overcurrent is prevented.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A power supply comprising a light source protecting unit, wherein the light source protecting unit comprises:
   a signal inputting unit varying a signal outputted based on an externally supplied control signal;
   a transformer generating a signal with a predetermined magnitude based on the signal from the signal inputting unit;
   a switching unit changing a DC voltage from a DC-DC converting unit into a voltage with a square wave based on a voltage from the transformer;
   an inductor averaging the square wave voltage from the switching unit to generate an average voltage and applying the average voltage as the light source driving voltage to the light source; and
   a sensing unit suspending the operation of the signal inputting unit when a magnitude of the average voltage from the inductor is larger than a predetermined value.

2. The power supply of claim 1, wherein the light source protecting unit further comprises a voltage dividing unit dividing the average voltage from the inductor,
   wherein the DC-DC converting unit adjusting the light source driving voltage based on the divided voltage from the voltage dividing unit.

3. A stabilizer circuit comprising:
   a signal inputting unit being supplied with an externally supplied control signal;
   a transformer connected to a supply voltage and the signal inputting unit;
   a switching unit being applied with an externally supplied voltage;
   a switching controlling unit connected to the transformer and the switching unit;
   a voltage averaging unit connected to the switching unit;
   a voltage dividing unit connected to the voltage averaging unit; and
   an overcurrent detecting unit connected to the voltage averaging unit.

4. The stabilizer circuit of claim 3, wherein the signal inputting unit comprises a switching element supplied with the externally supplied control signal.

5. The stabilizer circuit of claim 3, wherein the transformer is a pulse transformer.

6. The stabilizer circuit of claim 3, wherein the switching unit comprises a switching element having an input terminal to which the externally supplied voltage is applied and a control terminal connected to the switching controlling unit.

7. The stabilizer circuit of claim 6, wherein the switching unit further comprises a diode connected between the input terminal and an output terminal of the switching element.

8. The stabilizer circuit of claim 3, wherein the switching controlling unit comprises a first resistor connected to the transformer and a diode and a zener diode connected in series between the first resistor and the transformer.

9. The stabilizer circuit of claim 8, wherein the switching controlling unit further comprises a capacitor connected to the first resistor and a second resistor connected between the first resistor and the zener diode.

10. The stabilizer circuit of claim 3, wherein the voltage dividing unit comprises a voltage divider connected between the switching unit and a ground.

11. The stabilizer circuit of claim 10, wherein the voltage dividing unit further comprises a capacitor connected between the voltage divider and the ground.

12. The stabilizer circuit of claim 3, wherein the voltage averaging unit comprises an inductor.

13. The stabilizer circuit of claim 3, wherein the overcurrent sensing unit comprises:
   a capacitor connected to the switching unit;
   a resistor connected between the capacitor and the ground; and
   a switching element having a control terminal connected to the resistor, an input terminal connected to the signal inputting unit, and an output terminal connected to the ground.

14. The stabilizer circuit of claim 13, wherein the overcurrent sensing unit further comprises a capacitor connected to the input terminal of the switching element and the ground.

15. The stabilizer circuit of claim 3, further comprising a diode connected to the supply voltage and the transformer.

16. A display device comprising a lamp protecting unit, wherein the lamp protecting unit comprises:
   a signal inputting unit varying a signal outputted based on an externally supplied control signal;
   a transformer generating a signal with a predetermined magnitude based on the signal from the signal inputting unit;
   a switching unit changing the DC voltage from the DC-DC converting unit into a voltage with a square wave based on the signal with the predetermined magnitude from the transformer;
   an inductor averaging the square wave voltage from the switching unit to generate an average voltage and applying the average voltage to the lamp unit; and
   a sensing unit suspending the operation of the signal inputting unit when a magnitude of the average voltage from the inductor is larger than a predetermined value.

* * * * *